No. 825,439. PATENTED JULY 10, 1906.
C. S. WINSTON.
SPECIAL BUSY TEST FOR TELEPHONE LINES.
APPLICATION FILED DEC. 22, 1904.
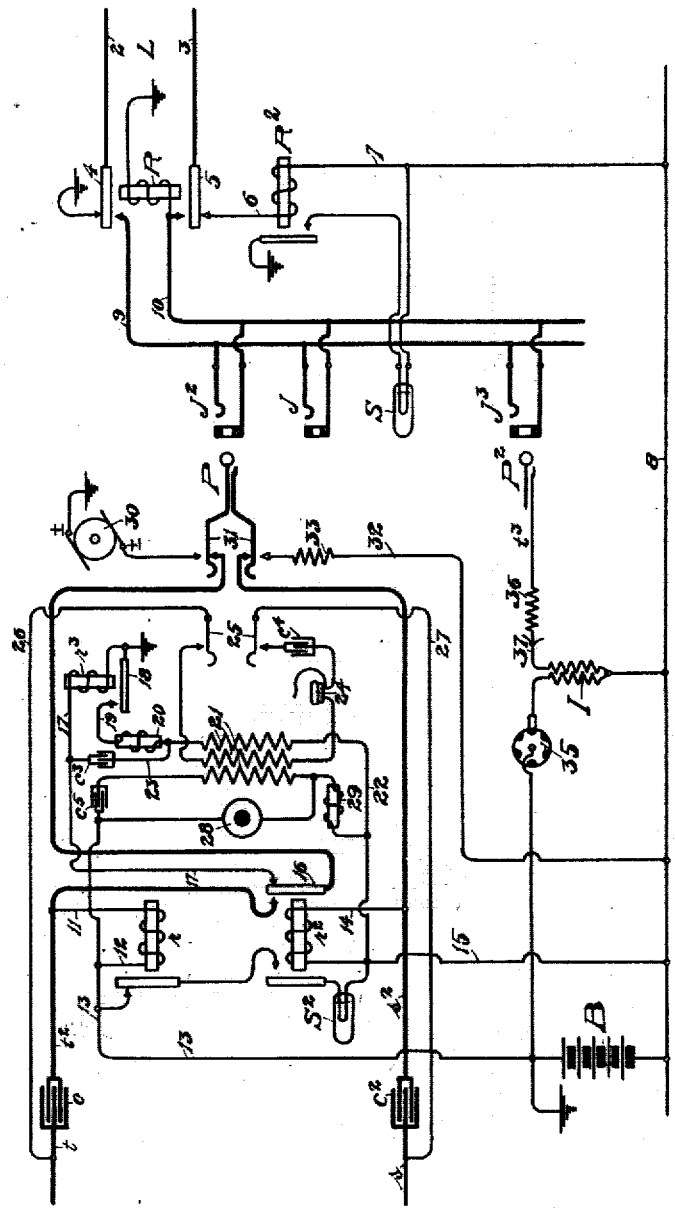
Witnesses.
Howard M. Post.
Edith F. Grier.
Inventor:-
Charles S. Winston
by Robert Lewis Ames,
Attorney.

UNITED STATES PATENT OFFICE.

CHARLES S. WINSTON, OF CHICAGO, ILLINOIS, ASSIGNOR TO KELLOGG SWITCHBOARD & SUPPLY COMPANY, OF CHICAGO, ILLINOIS, A CORPORATION OF ILLINOIS.

SPECIAL BUSY TEST FOR TELEPHONE-LINES.

No. 825,439.　　Specification of Letters Patent.　　Patented July 10, 1906.

Application filed December 23, 1904. Serial No. 237,911.

*To all whom it may concern:*

Be it known that I, CHARLES S. WINSTON, a citizen of the United States, residing in Chicago, county of Cook, and State of Illinois, have invented certain new and useful Improvements in Special Busy Tests for Telephone-Lines, of which the following is a specification.

My invention relates to improvements in apparatus to be used in connection with telephone systems, and more particularly to apparatus to enable the operator to become informed of the condition of the telephone-lines with which subscribers desire to be connected for conversation.

The object of my invention is to provide a special busy test for the subscribers' lines, whereby when the operators perform the usual operations of testing the lines to determine their idle or busy condition the said test is made manifest to them and they are thus informed of the special condition of the line.

This apparatus may be used in various ways and for various purposes; but one special service to which the invention is particularly applicable is in connection with the telephone-lines of an exchange upon which trouble exists and which are temporarily out of commission. The special test is applied to such lines whereby as soon as the operator makes the usual busy test she is informed of the fact that the line is temporarily in disuse and is thereby enabled to so inform the calling subscribers. It is apparent that in case no such special test is provided the operator is unable to receive either the ordinary busy test or to call the subscribers located on such lines, whereby she loses considerable time in repeatedly calling such parties and eventually is unable to give a satisfactory explanation to the waiting subscribers of the failure of such parties to respond. By the use of my invention such waste of time and labor and annoyance is avoided, since upon receiving such special test the operator can immediately make the proper explanation to the waiting subscriber.

My invention is illustrated in the accompanying drawing, in which the figure is a diagram of the central-office end of a common-battery subscriber's line and the calling or testing end of an operator's cord-circuit, as well as of the special testing apparatus that is required for such special busy test.

In the figure, L indicates a subscriber's line extending in two limbs 2 and 3 from the subscriber's station to the central office, where they terminate in the springs 4 and 5 of a cut-off relay R, the normal contact of the former spring being grounded, while the similar contact of the latter spring is connected by a conductor 6 with one terminal of the winding of the line-relay $R^2$, whose other terminal is joined by a conductor 7 with a battery-lead 8, extending from the live pole of the central common battery B. The said line-relay controls the local circuit of the line-signal S, which is preferably in the form of a small incandescent lamp. The forward contacts of said cut-off-relay springs 4 and 5 are connected with the switchboard-section of the telephone-line comprising the two conductors 9 and 10, leading to an answering-jack, such as J, and a plurality of multiple jacks, such as $J^2$ and $J^3$, the latter being provided in any desired number, according to the size of the switchboard.

The cord-circuit, of which the connecting or calling end only is shown, comprises in the latter a calling-plug P, having tip and sleeve contacts adapted to register, respectively, with the corresponding contacts of the spring-jacks of the lines when inserted therein. The tip-contacts of the two plugs of the cord-circuit (the answering-plug not being shown) are joined by the flexible strands $t$ and $t^2$ and the interposed condensers $c_1$, while their sleeve-contacts are similarly joined by the strands $s$ and $s^2$ and the interposed condensers $c^2$. A supervisory relay $r$ is connected upon one side by conductor 11 with the strand $t^2$ and upon the other side by conductors 12 and 13 with the grounded pole of the battery B. Similarly a coöperating supervisory relay $r^2$ is connected on one side by conductor 14 with the strand $s^2$ and upon the other side by conductors 15 and 8 with the live pole of the battery B. Thus the two relays, with the battery B interposed, are bridged across the calling end of the cord-circuit. The said two relays serve, as shown, to control the local circuit of the supervisory signal $S^2$, associated with this end of the cord-circuit, said relay $r$ serving to normally close the said local circuit and the relay $r^2$ to normally open the same. The relay $r^2$ is provided with an additional spring 16, connected with the forward portion of the strand $t^2$ and which in its forward position completes the two portions of the strand for conversation. The normal contact of said spring is connected through a suitable conductor 17 with a test-relay $r^3$, preferably of high resistance and impedance and whose other terminal is grounded. The spring 18 of said test-relay serves when attracted to close a path for current from ground at said relay through conductor 19, a retardation-coil 20, the tertiary winding of the operator's induction-coil, and by conductors 22 and 15 to the live pole of the battery B. A condenser $c^3$ is connected upon one side with the conductor 17 and upon the other by conductor 23 to a point between the retardation-coil 20 and the third winding of the operator's induction-coil 21. The arrangement of this retardation-coil 20 and the condenser $c^3$ in the operator's busy-testing circuit permits the special test to be received by the operator, as will be hereinafter described. The operator's head-receiver 24, a suitable condenser $c^4$, and the secondary winding of her induction-coil 21 are adapted to be bridged across the cord-circuit, preferably the answering end thereof, by means of the listening-key spring 25 and the conductors 26 and 27, leading therefrom to the strands $t$ and $s$. The operator's transmitter 28, together with the retardation-coil 29, condenser $c^5$, and the primary winding of her induction-coil 21, are suitably arranged in the usual manner to be charged from the battery B. A ringing-generator 30 is adapted to be connected between ground and the tip-contact of the plug by the operation of the ringing-key springs 31, the sleeve-contact of the plug being at the same time connected with the live pole of the battery B by means of conductor 32, including a suitable resistance 33.

In order to produce a special test which may be received by any of the operators provided with the above-described apparatus, I provide the apparatus shown at the lower side of the diagram, which includes an induction-coil I, the primary of which is included in a local circuit with the battery B, together with a suitable device (indicated at 35) for rapidly interrupting said local circuit and which may consist of a rapidly-rotating disk and contact-brush suitably arranged to make and break the circuit at a high rate. The secondary winding of said coil, which has one terminal joining the corresponding terminal of the primary winding, has its other terminal connected, through a suitable resistance-coil 36 and a flexible strand $t^3$, with the sleeve-contact of a plug $P^2$, adapted to fit and be inserted in the jacks of any of the lines and when so inserted to make contact with the test-ring of the jack. When, therefore, the special testing-plug, such as $P^2$, is inserted in one of the jacks of the line—as, for instance, jack $J^3$—a rapidly-alternating current is impressed upon the sleeve side of said line. At the same time current flows from the battery B over conductor 8, through the secondary winding of coil $l$, and thence over strand $t^3$, through the cut-off relay R to ground, thus operating the latter relay and preventing the operation of the line-signal in any way, as by a crossing of the line-wires or a ground upon the line. Now when a call is received from a subscriber for a connection with a line upon which such a special source of current has been impressed and the operator proceeds to test the line with her calling-plug in the usual manner the application of the tip P to the test-ring of a jack of said line results in a flow of such rapid alternating current from such secondary winding of the induction-coil I, through resistance 36, over strand $t^3$, the sleeve side of the line tested, the tip of the plug P, the forward portion of the strand $t^2$ of the testing-cord, spring 16 of relay $r^2$, conductor 17, and thence through the condenser $c^3$, the tertiary winding of the operator's coil 21, conductors 22, 15, and 8, back to the other terminal of the secondary coil. The passage of this rapidly-alternating current through the operator's induction-coil produces a tone in her receiver which is distinct from the ordinary busy test and from which she knows the special condition of the line and can so inform the waiting subscriber. Such alternating current does not flow through the test-relay $r^3$, due to its high impedance, and since said relay is operated at this time, due to the flow of battery-current therethrough, it will not pass back through the retardation-coil 20 and spring 18 direct to ground, due to the impeding effect of said coil 20.

The invention is thus thought to be made clear, inasmuch as the remainder of the apparatus is that ordinarily employed in one common type of two-wire system, and the operation of interconnecting the subscribers on such lines for conversation is well understood. In practicing my invention a plurality of plugs, such as plug $P^2$, are provided, as is indicated by the branching lines at 37, the induction-coil I and interrupter 35, as well as the battery, being common to the plugs. These plugs are ordinarily under the charge of one person, who as soon as trouble on a line is reported inserts one of the plugs in a jack of the line, where it remains until the trouble is cleared. The invention is applicable to different classes of service and may be embodied in other concrete forms without avoiding the scope or principle of the same. I therefore do not wish to be understood as limiting myself in all respects to the special details shown and described, but, on the contrary, hold it to include all such modifications and alterations as fairly fall within its purview.

I claim—

1. In a telephone system, the combination with telephone-lines terminating at the central office in the usual spring-jacks and having cut-off relays actuated over portions of the talking-circuits for rendering the line-signals inoperative, of a special testing apparatus provided with connecting-plugs adapted to be inserted in the said spring-jacks, said apparatus being arranged to impress a distinctive current upon the test-contacts of the jacks and at the same time to furnish current over the talking-circuits for the operation of the cut-off relays of the lines with which said plugs are connected, and test-receiving devices associated with the operators' cord-circuits responsive to such distinctive current, through a path opaque to steady currents and responsive to the ordinary busy test through a path opaque to the distinctive current, whereby when the operator makes the usual busy test of the line she is informed of the special condition of the line, substantially as described.

2. In a telephone system, the combination with telephone-lines provided with spring-jacks and cut-off relays operated by current over a portion of the talking-circuit, of a special testing apparatus provided with a connecting-plug adapted to be inserted in a spring-jack of any of the lines, said apparatus being arranged to impress upon the testing-terminals of the line with which the plug is connected a rapidly-varying current of one direction of flow only for the operation of the cut-off relay of the said line, an operator's cord-circuit, and test-receiving devices associated therewith responsive to such rapidly-varying currents through a path opaque to steady currents and responsive to the ordinary busy test through another path, whereby when a line having such testing apparatus applied thereto is tested in the usual manner the operator receives a distinctive signal and is thus informed of the condition of the line, substantially as described.

3. In a telephone system, the combination with telephone-lines provided with testing-terminals and cut-off relays all conductively associated with the talking-circuit of the lines, of a special testing apparatus adapted to be connected with the lines to impress upon the testing-terminals an unsteady distinctive current and at the same time to furnish current over the talking-circuits for the operation of the cut-off relays, a cord-circuit, a test-receiving device associated with the cord-circuit responsive to such distinctive current over a path opaque to steady currents and to steady currents over a path opaque to said distinctive current, whereby when the special apparatus is connected with a line and the operator makes the usual busy test she receives a distinctive signal and is thus informed of the condition of the line tested, substantially as described.

4. In a telephone system, the combination with telephone-lines having busy-testing terminals and cut-off relays connected with the talking-circuits of the lines, of a special testing apparatus having a connection-plug adapted to be inserted in a spring-jack of any line, a steady source of current and a source of rapidly-varying current included in said apparatus and adapted upon the insertion of the plug into a spring-jack of a line to impress thereon a single-direction pulsating current serving for the operation of the cut-off relay of the line and for testing, a cord-circuit, an operator's test-receiving induction-coil associated therewith, a condenser in the circuit with said test-receiving coil and intercepting the metallic connection between said coil and the tip-strand of said cord-circuit, and a relay of high inductance normally connected between said tip-strand and ground and adapted to be actuated only by steady currents whereby the varying currents will pass through the condenser and coil to give one form of signal to the operator, and the said currents will pass through the relay and actuate it and a conductor connected with contacts of said relay and with the said induction-coil whereby the actuation of said relay gives another form of signal to the operator, substantially as described.

5. In a telephone system, the combination with telephone-lines having testing-terminals, of special testing apparatus adapted to be connected with the lines and to impress upon the testing-terminals a rapidly-varying current, an operator's cord-circuit, a busy-testing circuit completed over a strand thereof, said circuit including electromagnetic apparatus through which the usual testing-current is adapted to flow, and a condenser connected in series with said testing-circuit and in parallel with said electromagnetic device to provide a path for the rapidly-varying current in case a line to which said special testing apparatus is applied is tested, whereby the distinctive test is received by the operator and she is thus informed of the special condition of the line, substantially as described.

6. In a telephone system, the combination with a telephone-line having testing-terminals connected with the talking-circuit thereof, of special testing apparatus adapted to be connected with the line to impress upon the testing-terminals a rapidly-varying current, an operator's cord-circuit having a testing-circuit completed over a strand thereof and containing a coil of high impedance to prevent a sudden variation of potential upon the telephone-line in making the usual busy test, and a condenser connected with said testing-circuit in advance of said coil to provide a ready path for the rapidly-varying currents, whereby the operator is enabled also to receive the distinctive test caused by the said rapidly-varying currents when testing a line to which such special testing apparatus has been applied, substantially as described.

7. In a telephone system, the combination with telephone-lines, of a varying-current-test producer adapted to be connected with the lines and a test-receiving apparatus adapted to receive a varying-current test over one path, and a steady-current test over another path, substantially as described.

Signed by me at Chicago, county of Cook, and State of Illinois, in the presence of two witnesses.

CHARLES S. WINSTON.

Witnesses:
 ROBERT LEWIS AMES,
 EDITH F. GRIER.